US009092622B2

United States Patent
Moyer et al.

(10) Patent No.: US 9,092,622 B2
(45) Date of Patent: *Jul. 28, 2015

(54) RANDOM TIMESLOT CONTROLLER FOR ENABLING BUILT-IN SELF TEST MODULE

(75) Inventors: William C. Moyer, Dripping Springs, TX (US); Jeffrey W. Scott, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,580

(22) Filed: Aug. 20, 2012

(65) Prior Publication Data

US 2014/0053003 A1 Feb. 20, 2014

(51) Int. Cl.
*G06F 21/55* (2013.01)

(52) U.S. Cl.
CPC ............ *G06F 21/558* (2013.01); *G06F 21/556* (2013.01)

(58) Field of Classification Search
None
See application file for complete search history.

(56) References Cited

U.S. PATENT DOCUMENTS

| 5,073,891 | A | 12/1991 | Patel |
|---|---|---|---|
| 5,383,143 | A | 1/1995 | Crouch et al. |
| 5,673,388 | A | 9/1997 | Murthi et al. |
| 5,680,544 | A | 10/1997 | Edmondson et al. |
| 5,940,588 | A | 8/1999 | Kikinis |
| 6,477,251 | B1 | 11/2002 | Szrek et al. |
| 6,601,197 | B1 | 7/2003 | Naritake |
| 6,678,853 | B1 * | 1/2004 | Brummel ...................... 714/739 |
| 6,724,894 | B1 | 4/2004 | Singer |
| 6,766,455 | B1 | 7/2004 | Ryan, Jr. |
| 6,807,646 | B1 | 10/2004 | Williams et al. |
| 6,983,407 | B2 | 1/2006 | Appinger et al. |
| 7,412,468 | B2 | 8/2008 | Butler |
| 7,472,224 | B1 * | 12/2008 | Klass et al. ................... 711/119 |
| 7,555,787 | B2 | 6/2009 | Clercq |
| 7,636,858 | B2 | 12/2009 | Khan et al. |
| 7,702,705 | B2 | 4/2010 | Suzuki |
| 7,778,413 | B2 | 8/2010 | Hwang |
| 7,853,012 | B2 | 12/2010 | Sarangarajan et al. |
| 7,899,190 | B2 | 3/2011 | Gebotys |
| 8,341,476 | B1 | 12/2012 | Peng et al. |
| 8,407,452 | B2 | 3/2013 | Yoshimi |
| 2002/0104052 | A1 | 8/2002 | Nolles et al. |
| 2004/0019798 | A1 | 1/2004 | Ishii |
| 2004/0078402 | A1 | 4/2004 | Butler |

(Continued)

OTHER PUBLICATIONS

U.S. Appl. No. 13/169,664, filed Jun. 27, 2011, entitled "Using Built-In Self Test for Preventing Side Channel Security Attacks on Multi-Processor Systems".

(Continued)

*Primary Examiner* — Jung Kim
*Assistant Examiner* — Janusz Kusyk (57) ABSTRACT

A data processing system having a first processor, a second processor, a local memory of the second processor, and a built-in self-test (BIST) controller of the second processor which can be randomly enabled to perform memory accesses on the local memory of the second processor and which includes a random value generator is provided. The system can perform a method including executing a secure code sequence by the first processor and performing, by the BIST controller of the second processor, BIST memory accesses to the local memory of the second processor in response to the random value generator. Performing the BIST memory accesses is performed concurrently with executing the secure code sequence.

17 Claims, 8 Drawing Sheets

(56) References Cited

U.S. PATENT DOCUMENTS

| | | |
|---|---|---|
| 2004/0199824 A1 | 10/2004 | Harter |
| 2004/0230882 A1 | 11/2004 | Huott et al. |
| 2005/0055596 A1 | 3/2005 | Abe et al. |
| 2005/0265547 A1 | 12/2005 | Strasser et al. |
| 2006/0107156 A1* | 5/2006 | Lee et al. ............... 714/739 |
| 2006/0143390 A1 | 6/2006 | Kottapalli |
| 2006/0184987 A1 | 8/2006 | Allen et al. |
| 2007/0047623 A1 | 3/2007 | Eun et al. |
| 2007/0127431 A1 | 6/2007 | Eun et al. |
| 2008/0263414 A1 | 10/2008 | Saito et al. |
| 2009/0161722 A1* | 6/2009 | Gorman et al. ............... 374/142 |
| 2009/0245013 A1* | 10/2009 | Chandra et al. ............... 365/239 |
| 2009/0327664 A1* | 12/2009 | Yoshimi ............... 712/221 |
| 2009/0327680 A1 | 12/2009 | Dale et al. |
| 2010/0218059 A1 | 8/2010 | Gangasani et al. |
| 2014/0132291 A1 | 5/2014 | Somachudan et al. |

OTHER PUBLICATIONS

Agarwal, A. et al., "A Novel Fault Tolerant Cache to Improve Yield in Nanometer Technologies," IEEE Proceedings of the 10th International On-Line Testing Symposium 2004, Jul. 12-14, 2004, pp. 149-154.

Agnola, L. et al., "Self-Adaptive Mechanism for Cache Memory Reliability Improvement," IEEE 13th International Symposium on Design and Diagnostics of Electronic Circuits and Systems 2010, Apr. 14-16, 2010, pp. 117-118.

Benso, A. et al., "Online and Offline BIST in IP-Core Design," IEEE Design & Test of Computers, vol. 18, No. 5, pp. 92-99, Sep.-Oct. 2001, doi:10.1109/54.953276.

Li, Y. et al, "CASP: Concurrent Autonomous Chip Self-Test Using Store Test Patterns," 2008 Design, Automation and Test in Europe, Mar. 10-14, 2008, 6 pages.

Ramaswamy, S. et al., "Customizable Fault Tolerant Caches for Embedded Processors," IEEE International Conference on Computer Design 2006, Oct. 1-4, 2007, pp. 108-113.

Tehranipour, M.H. et al., "An Efficient BIST Method for Testing of Embedded SRAMs," 2001 IEEE International Symposium on Circuits and Systems, Jan. 2001, vol. 5, pp. 73-76.

Non-Final Office Action mailed Aug. 15, 2013 for U.S. Appl. No. 13/169,664, 17 pages.

Notice of Allowance mailed Feb. 3, 2014 for U.S. Appl. No. 13/169,664, 19 pages.

Non-Final Office Action mailed Nov. 28, 2014 for U.S. Appl. No. 13/690,888, 35 pages.

Final Office Action mailed Apr. 10, 2014 for U.S. Appl. No. 13/690,888, 25 pages.

* cited by examiner

RANDOM TIMESLOT CONTROLLER FOR ENABLING BUILT-IN SELF TEST MODULE

CROSS-REFERENCE TO RELATED APPLICATION

The present application is related to co-pending U.S. patent application Ser. No. 13/169,664, entitled "USING BUILT-IN SELF TEST FOR PREVENTING SIDE CHANNEL SECURITY ATTACKS ON MULTI-PROCESSOR SYSTEMS," filed on Jun. 27, 2011, the entirety of which is herein incorporated by reference.

FIELD OF THE DISCLOSURE

This disclosure relates generally to systems including electronic devices, and more particularly, to systems implementing built-in self test operations.

BACKGROUND

Computing systems often require operations to be carried out in a secure manner. For embedded computing devices and for pervasive systems, security of operation is often desirable. To ensure operations and communications are secure, such systems employ cryptographic methods.

The implementation of such a cryptographic method must itself be secure. However, cryptographic methods are subject to attacks. One type of non-invasive attack on computing devices implementing cryptographic methods is known as a side-channel attack. A side channel attack is any attack on the computing device based on information gained from the physical implementation of the computing system, rather than using a brute force attack or exploiting a theoretical weakness in the cryptographic algorithms. For example, timing information, power consumption, electromagnetic leaks, and sound can be used to as sources of information that can be used to break a system.

A power consumption attack, for example, involves the monitoring of the power consumption of one or more components of a device while the device executes a cryptographic method. One example of a power consumption attack is a differential power analysis. The data derived from monitoring power consumption of the device, combined with some knowledge of the operations being carried out by the device, can be used to derive the secret information that is part of the cryptographic method.

BRIEF DESCRIPTION OF THE DRAWINGS

The present disclosure may be better understood with reference to the accompanying drawings.

The use of the same reference symbols in different drawings indicates identical items unless otherwise noted. The Figures are not necessarily drawn to scale.

DETAILED DESCRIPTION

A mechanism is provided for generating a random power profile of a computing device executing a secure operation in order to prevent a side-channel attack that uses power consumption information. The secure operation can be implemented using a data processor implemented as a state machine or as an instruction based data processor that implements code in a secure manner, e.g., executes secure code. By way of example, it is presumed that secure operations are implemented by executing secure code on a processor, such as an instruction-based processor.

According to an embodiment, in a computing device, which can be in integrated circuit die, having two or more processors, a processor that is not executing secure code performs random accesses of local memory thereby obscuring power consumption due to the processor executing the secure code. According to an embodiment, the random accesses can occur during random periods of time during which built-in self-test (BIST) logic that accesses the memory has been enabled. The memory accesses obscure the power consumption of the processor executing the secure operation due to the variable power consumption of memory array access. According to another embodiment, the BIST module can be randomly enabled to aid in providing power fluctuations that obfuscate power consumption associated with execution of the secure operation. In addition to being randomly enabled, the BIST module can generate random data, random addresses, and random times for reads and writes to the memory to further obfuscate power consumption of the secure operation, which further prevents an attacker attempting to perform a power consumption side channel attack. Various embodiments of the present disclosure will be better understood with reference to FIGS. 1-11.

Figure 1:
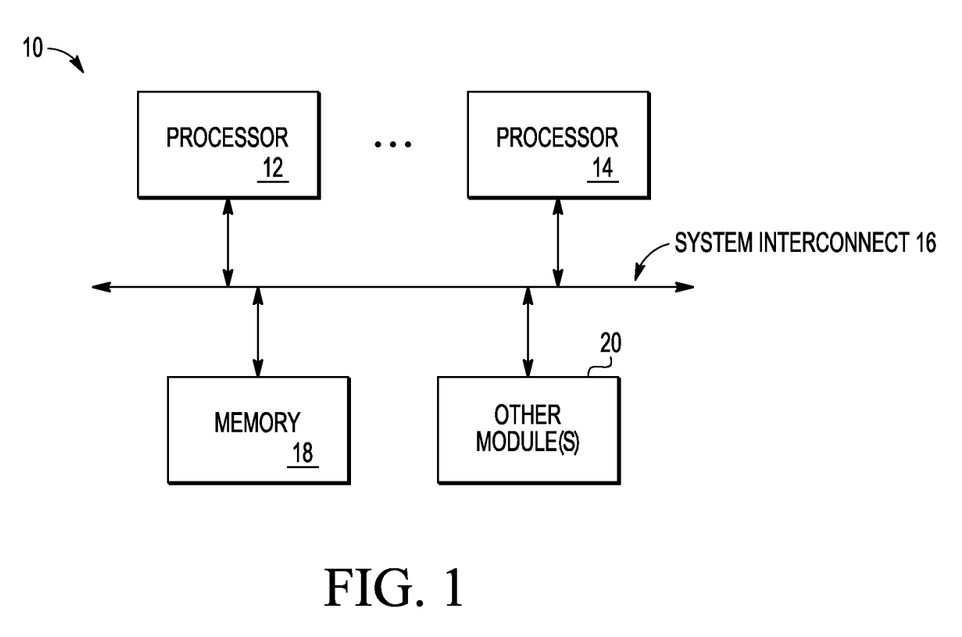
FIG. 1 is a simplified block diagram illustrating one example of a data processing system usable with embodiments of the present disclosure.

FIG. 1 is a simplified block diagram illustrating one example of a system device referred to herein as system 10 that includes a data processing system that includes processors 12 and 14 bidirectionally connected to a system interconnect 16. System interconnect 16 provides communication between the processors and memory 18 and other modules 20 (e.g., peripherals, input/output devices and the like). System interconnect 16 can be implemented in a variety of manners including as a system bus, as a cross-bar switch, or as other types of interconnect fabric. Memory 18 is bidirectionally connected to system interconnect 16 and can be any type of memory, such as, for example, read-only memory (ROM), random access memory (RAM), and the like. Other modules 20 are bidirectionally connected to the system interconnect 16 and may include any type and number of other modules, such as, for example, peripherals including input/output (I/O) devices, timers, memories, and the like.

Embodiments of the present disclosure may use more, less or different functional blocks than the units illustrated within system 10. Further, one or more of the functional blocks of system 10 may include an external port for communication external to system 10. In operation, processors 12 and 14, memory 18, and other modules 20 operate as known in the art of multiple processor systems. While system 10 is illustrated with two processors, alternate embodiments may include any plurality of processors, which may be the same, or may be different.

Figure 2:
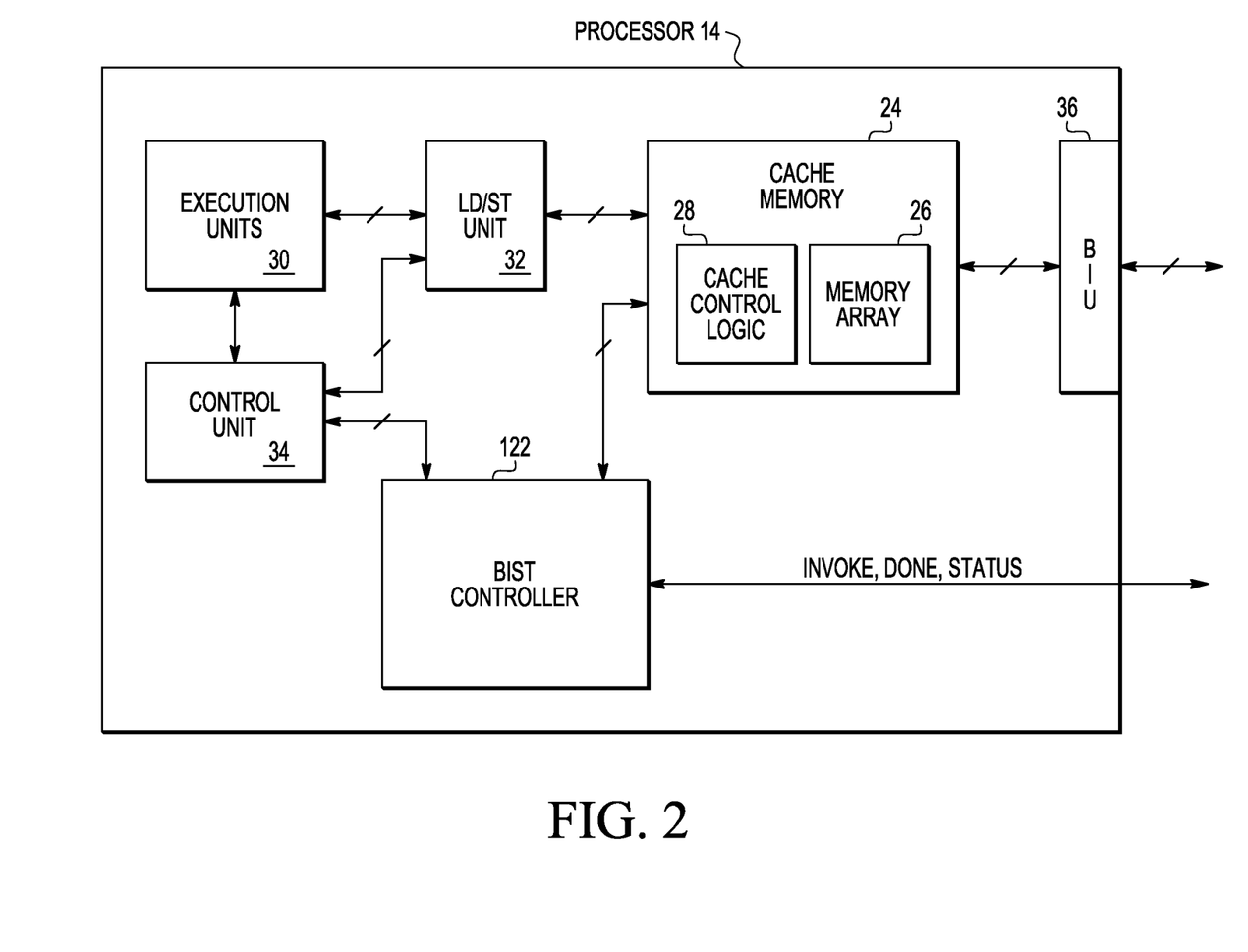
FIG. 2 is a simplified block diagram illustrating one example of a processor incorporating a BIST controller according to embodiments of the present disclosure.

FIG. 2 is a simplified block diagram illustrating one example of a processor 14 incorporating a BIST controller according to embodiments of the present disclosure. In particular, processor 14 includes a BIST controller 22 connected to a cache memory 24 that is local to processor 14. As will be discussed in greater detail below, BIST controller 22 is configured to perform both traditional BIST memory access functions related to memory testing (e.g., writing data to memory locations and comparing the stored data with the data written), as well as random BIST memory access functions that can be used to cause a random power profile during secure code operations by processor 12 of system 10 (e.g., writing random data to random memory locations (loading and storing) as well as reading data from random memory locations). According to an embodiment, processor 14 can be an instruction-based-processor that includes one or more execution units 30 that can execute instructions. Execution units 30 are connected to load/store unit 32 that provides memory access operations to and from the execution units. Control unit 34 is connected to execution units 30, load/store unit 32 and BIST controller 22. Control unit 34 directs operations of components of processor 14.

Cache memory 24 provides a local memory accessible to processor 14. Cache memory 24 includes a memory array 26 that is configured to store data sequences in addressable data locations (e.g., cache lines). Cache control logic 28 provides access functions to the memory array. Cache control logic 28 interfaces with BIST controller 22 and load/store unit 32 to provide the access functions to the memory array. Communication to and from processor 14 is provided using bus interface unit (BIU) 36. BIU 36 can fetch instructions, read operands, write information to system memory, and the like. BIST controller 22 is configured for bidirectional communications with external devices. Such communications can include signals to invoke and stop BIST operations, status indications and the like.

Figure 3:
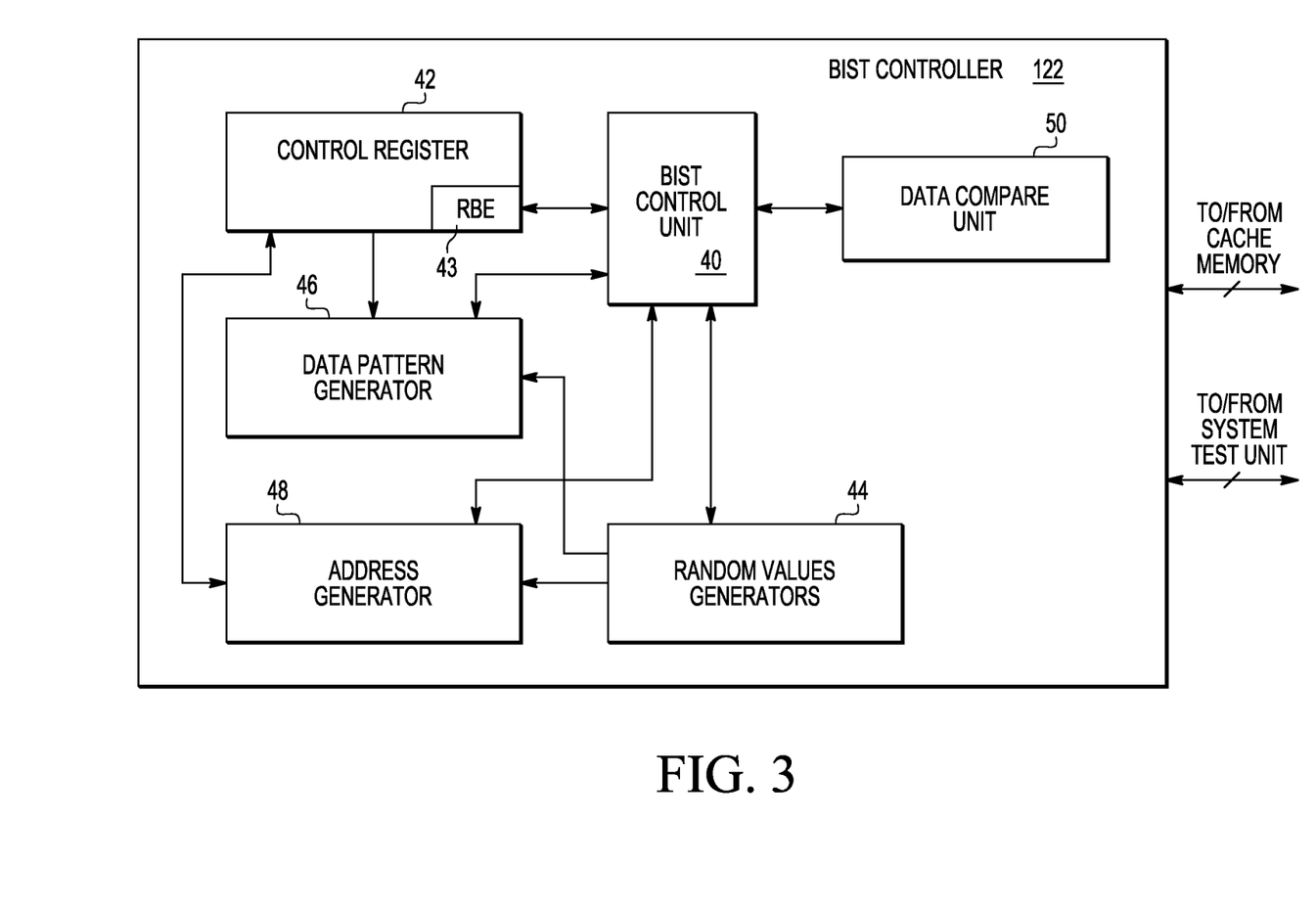
FIG. 3 is a simplified block diagram illustrating one example of a built-in self-test controller configured to implement embodiments of the present disclosure.

FIG. 3 is a simplified block diagram illustrating an embodiment (122) of BIST controller 22 of FIG. 2. BIST controller 122 includes a BIST control unit 40 that controls data flow operations of the BIST controller. Connected to the BIST control unit is a storage module illustrated as a control register 42 that includes storage locations, including a storage location 43 that includes bit labeled RBE (random BIST enable). The RBE bit can be set by another processor that is executing a secure operation. For example, prior to, or contemporaneously with execution of a secure code sequence processor 12 can assert the RBE bit of processor 14 by write access to a memory mapped location of control register 42. Thus, processor 12 has storage access to the RBE bit. In addition, BIST control unit 40 of processor 14 can also access the RBE bit. In other embodiments, the RBE bit can be set by other means than the processor 14 (e.g., by another master having access to the control register comprising the RBE, by an asserted signal, by an interrupt signal, by processor 14 monitoring the state of processor 12, in response to a system event, and the like). In response to the RBE bit being set, the BIST control unit initiates a random BIST memory access as described herein.

The RBE bit is a mechanism for a processor executing a secure code sequence to inform a BIST module of this execution, e.g., by the processor executing secure code that sets the RBE bit, so that random BIST memory accesses can be performed by the BIST module. Alternatively, the first processor can inform the BIST module by providing a selected interrupt request to the second processor. In another alternative, the BIST module, or some other portion of the device, can determine whether the first processor is executing a secure code by monitoring access to memory locations of the secure code or data related to the secure code, and upon access by the first processor begin random BIST memory access. Subsequent to, or contemporaneously with, execution of the secure code, the BIST module can be notified to stop performing random BIST memory access. In a further alternative embodiment, the second processor can begin performing random BIST memory access in response to a system event.

A random value generator 44, connected to BIST control unit 40, generates random values usable by other components of BIST controller 122. The random value generator 44 can be implemented by a variety of random value generators known in the art, such as an LFSR (linear feedback shift register). Random values generated by random value generator are made available to data pattern generator 46, address generator 48 and BIST control unit 40, which are all connected to the random value generator. The term "random", and its variants, as used herein is intended to mean a true random number, a pseudo random number, or other number having a value unknown to a user.

Data pattern generator 46 can use a seed value, which can be a random value, to generate a random data pattern that is provided to BIST control unit 40 for storing to a memory location. The data pattern generator 46 is configured to perform both traditional BIST data pattern generation for BIST functions (e.g., pre-determined data values or data sequences, which can be based upon a known seed value) as well as the random BIST data pattern generation of embodiments of the present disclosure. Random seed values can be provided by random value generator 44 to data pattern generator 46 for each desired data pattern, or a previously generated random data pattern can be used as a seed for generating a next random data pattern, as desired for a particular implementation. Similarly, address generator 48 can use a random value generated by random value generator 44 as a seed to generate an initial random memory address that is provided to BIST control unit 40 for designating a memory location at which to perform a memory access. Subsequent random addresses can be generated using additional random values generated by random value generator 44 as a seed or using a previously generated random memory location as the seed. Address generator 48 is configured to perform both traditional BIST address generation for BIST testing as well as the random BIST address generation discussed above.

BIST control unit 40 uses an address generated by address generator 48 to store data generated by data pattern generator 46 in a location corresponding to the address of a memory local to the processor (e.g., memory array 26 of cache memory 24). Addresses and data values can either be values used for standard BIST memory testing or the random BIST data patterns and addresses generated by embodiments of the present disclosure. When writing standard BIST memory test values, data compare unit 50 is used to compare the values written with those stored in the memory (e.g., the value is read back from the memory location by BIST control unit 40 and compared by data compare unit 50). If the values do not match, this may indicate the presence of a defective memory cell. When writing the random BIST data of embodiments of the present disclosure, data compare unit 50 is not needed to determine whether the stored value is accurate since the purpose of this operation is not to test the memory but to utilize it for power consumption purposes.

Figure 4:
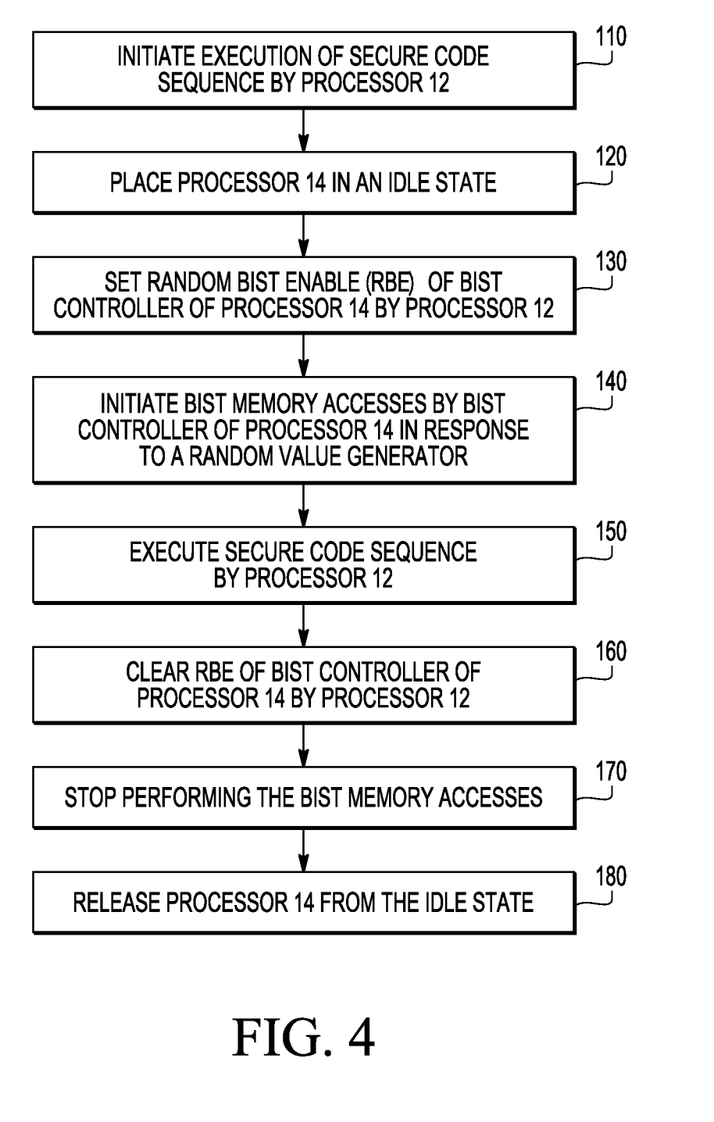
FIG. 4 is a simplified flow diagram illustrating a process for generating a random power consumption profile, according to an embodiment of the present disclosure.

FIG. 4 is a simplified flow diagram illustrating a process for generating a random power consumption profile, according to an embodiment of the present disclosure. The process begins with an initiation of execution of a secure code sequence by a first processor (e.g., processor 12) (110). Such a secure code sequence can include, for example, cryptographic code having crypto keys, and the like. As the processor performs initiation tasks, it is determined if a second processor (e.g., processor 14) be placed in an idle state, if necessary (as discussed below) (120). If the secure code sequence is performed by the first processor during, for example, boot sequence operations, then the second processor may already be idle and thus will not need to be actively placed in an idle state. On the other hand, should the secure code sequence be performed at a time when the second processor is performing other tasks, the second processor will be put into an idle state (e.g., interrupting current operations and storing current operational state information) in order to perform BIST-directed operations discussed below. According to embodiment, the first processor is responsible for determining whether the second processor is in an idle state, and for communicating with the second processor to effectuate a transition of the second processor to an idle state. Alternatively, the second processor can monitor activity of the first processor, and place itself in an idle state accordingly.

The first processor also sets a random BIST enable bit (RBE) in a control register of the BIST controller (e.g., storage location 43 of control register 42 of BIST controller 122) of the second processor (130). Assertion of the RBE enables the BIST controller 122 to perform random BIST operations (140). Random value generator 44 of the BIST controller 122 generates one or more random values that are used to generate random data patterns (e.g., by data pattern generator 46) and random memory addresses (e.g., by address generator 48). The random data patterns can be loaded or stored at the random data addresses of a memory local to the second processor (e.g., memory array 26 of cache memory 24). The generated addresses can indicate memory locations that are to be accessed, where the memory access can be a read access or a write access, e.g., load or store accesses, which can itself be determined randomly. Randomly selecting whether an access is a read access or a write access can aid in disguising power consumption since, in general, memory stores consume more power than a memory load. In addition, the BIST controller 122 can perform the loading/storing tasks at random intervals, determined by the BIST control unit 40 in response to random values generated by the random value generator 44. Varying the idle time in this manner can further randomize the power consumption profile of the computing device. The BIST controller 122 can also perform read accesses to random data addresses at random intervals, as provided, for example, in one embodiment discussed below. While the second processor 14 is performing the random BIST memory access, the first processor 12 proceeds with executing the secure code sequence (150).

Once the first processor has completed the secure code sequence, it is no longer necessary for the second processor to continue to perform random BIST memory accesses. The first processor can then clear the RBE of the second processor's BIST controller (160). In response to the clearing of the RBE, the second processor stops performing BIST memory access (170). The second processor is then released from the idle state, if necessary (180).

In one embodiment, the second processor may be requested to perform random BIST memory access immediately following a reset state of system 10. In this case, the local memory of the second processor typically contains no current information, and thus random BIST memory access may consist of a series of memory store operations which write random data values to random addresses. When completion of the secure code sequence by the first processor occurs, the second processor may be reset, and begin execution from a reset state.

In another embodiment, the second processor may be executing applications at the time it is requested to begin performing random BIST memory accesses, in conjunction with the first processor beginning execution of a secure code sequence. The second processor can be informed of such a request, for example, by an interrupt request generated by the first processor or by monitoring of the state of the RBE control bit for requests. In this situation, it will typically be desired for the second processor to temporarily interrupt execution of the application and to later continue with execution of the application once the first processor has completed execution of the secure code sequence. In this case, the second processor can be placed in an idle state, in which no instruction execution is performed (e.g., 120). Control is then given to BIST controller 122 for performing the random BIST memory accesses. Since the local memory contains information related to the ongoing execution of the second processor, the BIST controller may be controlled (or restricted) to only performing memory read operations for the random BIST memory accesses, and not performing memory write operations which would disturb the state of the suspended application. This embodiment contrasts with normal memory BIST operations in which a pattern of data is written to pre-determined memory locations and then read back for performing data value comparisons to ensure the proper operation of the memory storage locations. Since no modification of the memory locations are made, the second processor is able to resume execution of the interrupted (suspended) application once the first processor has completed the secure code sequence. No reset or invalidation of the local memory of the second processor is performed. Alternatively, the BIST controller 122, in response to RBE being set, can communicate with the memory being accessed, e.g., the cache memory, to save the contents of the cache memory before proceeding with random write accesses. This embodiment contrasts with normal memory BIST operation in that requesting a writeback of cache data to another storage location is not performed with respect to a normal BIST operation.

Figure 5:
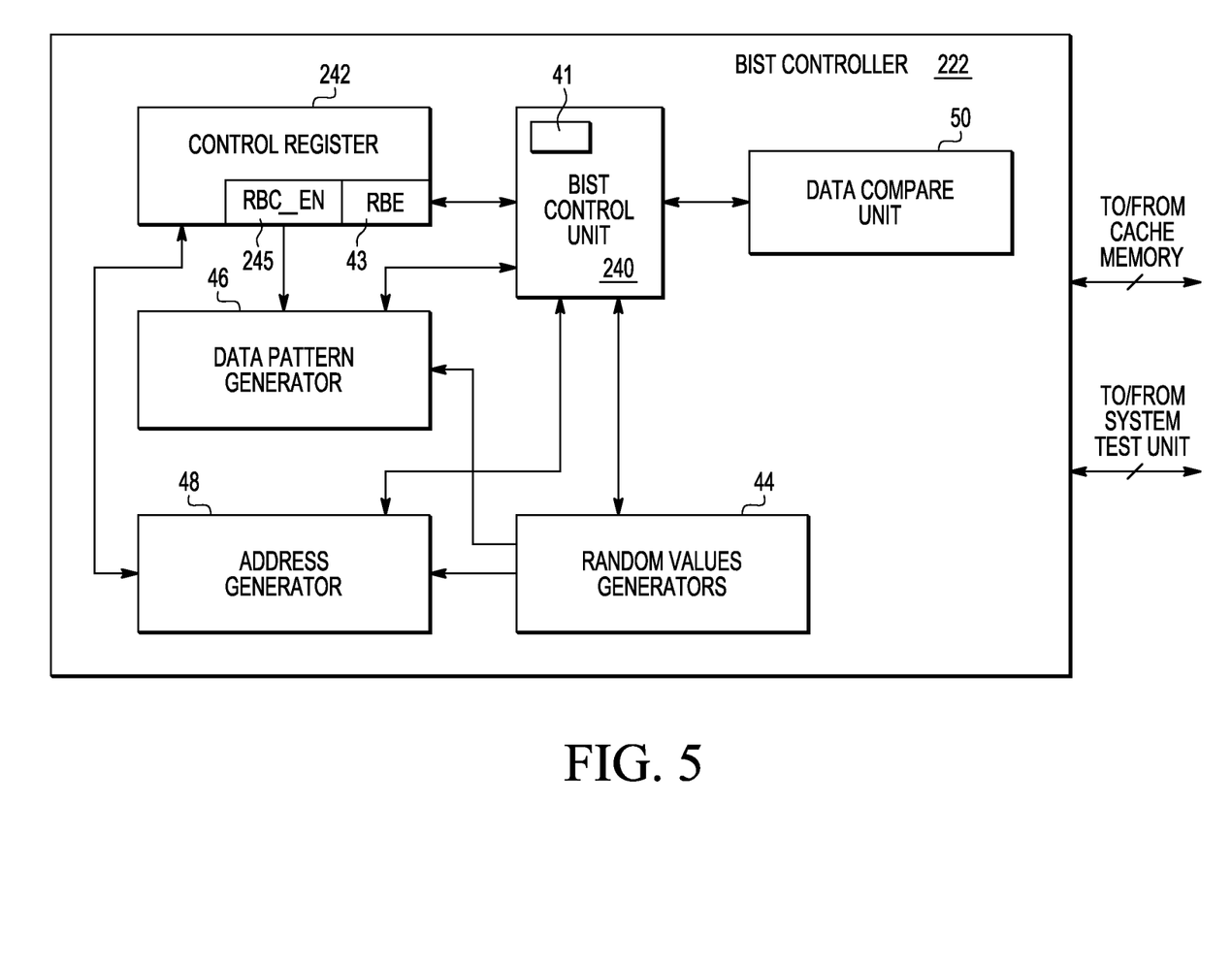
FIG. 5 is a simplified block diagram illustrating one example of a built-in self-test controller configured to implement embodiments of the present disclosure.

FIG. 5 is a simplified block diagram illustrating an embodiment 222 of BIST controller 22 that includes additional features that facilitate generating a random power pattern at integrated circuit die to help obfuscate power being consumed by a secure module. BIST controller 222 includes a BIST control unit 240 that is connected to a control register 242, a data pattern generator 46, an address generator 48, a random values generators 44, and a data compare unit 50, wherein modules of FIG. 5 that are identically numbered to modules of FIG. 3 can operate in the same manner as that previously described.

The control register 242 illustrated in FIG. 5 includes an extra storage location 245 where an additional control bit, labeled RBC_EN is stored. The control unit 240 is illustrated to include a module 41 that represents timeslot generator that randomly activate/deactivates the BIST controller 222 during random time slots that correspond to when timeslot generate 41 is providing an asserted signal. It will be appreciated, that the random number generation features of timeslot generator 41 can also reside within the random values generator module 44.

During traditional operation BIST controller 222 is controlled from a system test unit in a manner that allows the BIST controller 222 to test the processor to which it belongs, after which the BIST controller 222 enters an idle mode until otherwise enabled. It will be appreciated, that the system test unit can be incorporated at the same integrated circuit die as BIST controller 222 or implemented external the integrated circuit die.

In response to the RBE bit being asserted and the RBC_EN bit being negated, the BIST controller 222 will exit idle mode and operate in the manner previously described to randomly modify power consumption of the integrated circuit die by continuously performing random accesses to memory of the processor at which the BIST controller 222 resides—until the RBE bit is negated.

In response to RBC_EN being asserted, the BIST controller 222 will randomly assert and negate an enable signal to generate random time slots, defined by asserted portions of the enable signal, during which BIST controller 222 is enabled. According to one embodiment, controller 222 will operate to access a memory based upon randomly generated data and addresses, as previously described, in response to bits RBC_EN and RBE being asserted contemporaneously with each other; otherwise, controller 222 will operate in an alternate manner in response bit RBC_EN being asserted contemporaneously with bit RBE being negated. For example, the alternate manner can result in the BIST controller operating in a traditional manner that occurs during normal start-up, or a predefined BIST test routine can be executed, such as a test routine that is implemented during traditional BIST testing. It will be appreciated that according to an embodiment the predefined BIST test routine can be user selectable. According to an alternate embodiment, when bit RBC_EN is asserted, it will operate to access the memory based upon randomly generated data and addresses during random time slots to access memory based upon randomly generated data and address as previously described, regardless as to the asserted/negated state of bit RBE.

Figure 6:
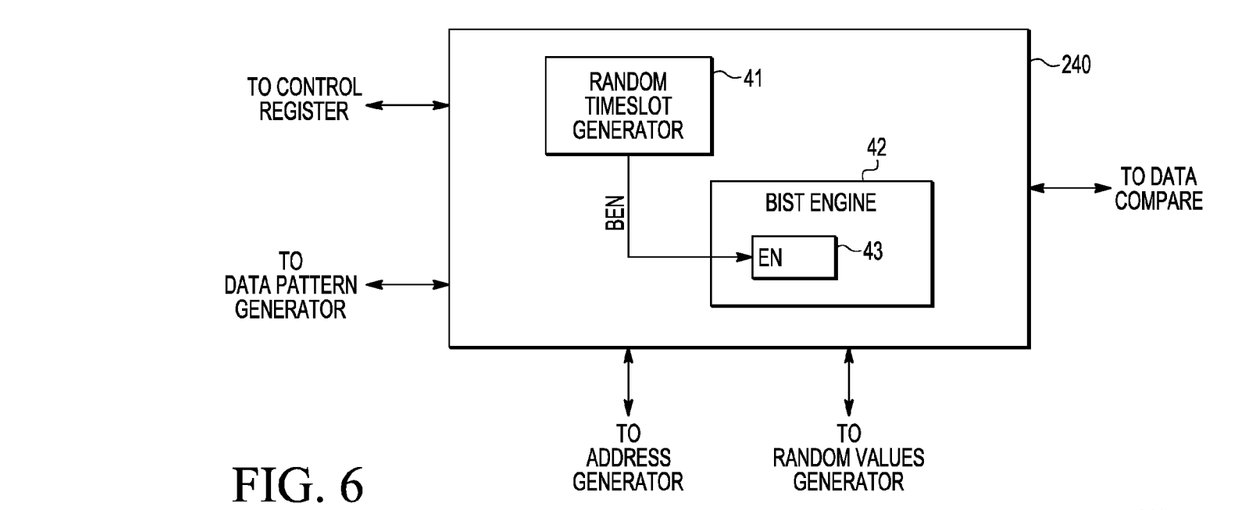
FIG. 6 is a simplified block diagram illustrating a portion of the BIST controller of FIG. 5 in accordance with a specific embodiment of the present disclosure.

FIG. 6 illustrates a particular embodiment of the BIST control unit 240 that includes a random timeslot generator 41 and a BIST engine 42 that includes a portion 43 that interfaces with the random timeslot generator 41 to control operation of the BIST control unit 240. The random timeslot generator 41 generates a signal BEN that when asserted activates BIST engine 42. For purposes of discussion, it is presumed that BIST controller 222 operates to randomly access memory in the manner as previously described in response to signal BEN being asserted. Various embodiments of the random timeslot generator 41 are illustrated in FIGS. 7-10.

Figure 7:
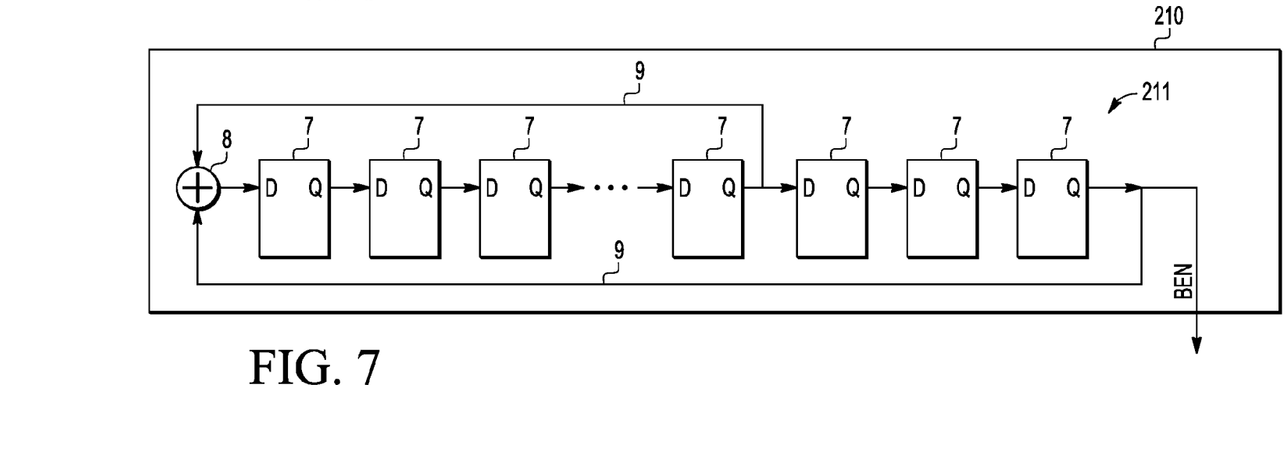
FIG. 7 is a simplified block diagram illustrating one embodiment of a random timeslot generator of FIG. 6 in accordance with a specific embodiment of the present disclosure.

FIG. 7 illustrates a particular embodiment 210 of the random timeslot generator 41 of FIG. 6. In particular, the random timeslot generator 210 includes an LFSR 211 that includes a plurality of D flip-flops 7 connected in series, with the output of two or more of the D flip-flops 7 fed back via interconnects 9 to a logic device 8 that provides a logic signal to the first D flip-flop of the series. An output of one of the D flip-flops 7 is tapped to provide the BEN signal, causing the BIST controller 222 to be activated. For purposes of discussion, it is presumed that the BEN signal is a random signal having a 50% activity factor. Thus, the timeslot generator 40 generates a control signal having an activity factor of 50% in response to LFSR 210 being enabled. The term activity factor as used herein with respect to a signal is intended to represent an activity ratio of the signal in percentage form; wherein the term activity ratio as used herein is intended to mean the expected ratio between the sum of the asserted portions of a signal during a sufficiently long time period and the duration of the sufficiently long time period during which time it is likely the signal will be asserted and negated multiple times. It will be appreciated, that with respect to a randomly generated signal that the total amount of time over which an expected activity factor occurs can vary due to the random nature of the signal. Thus an activity ratio of 1:2 (0.5) corresponds to an activity factor of 50%.

Figure 8:
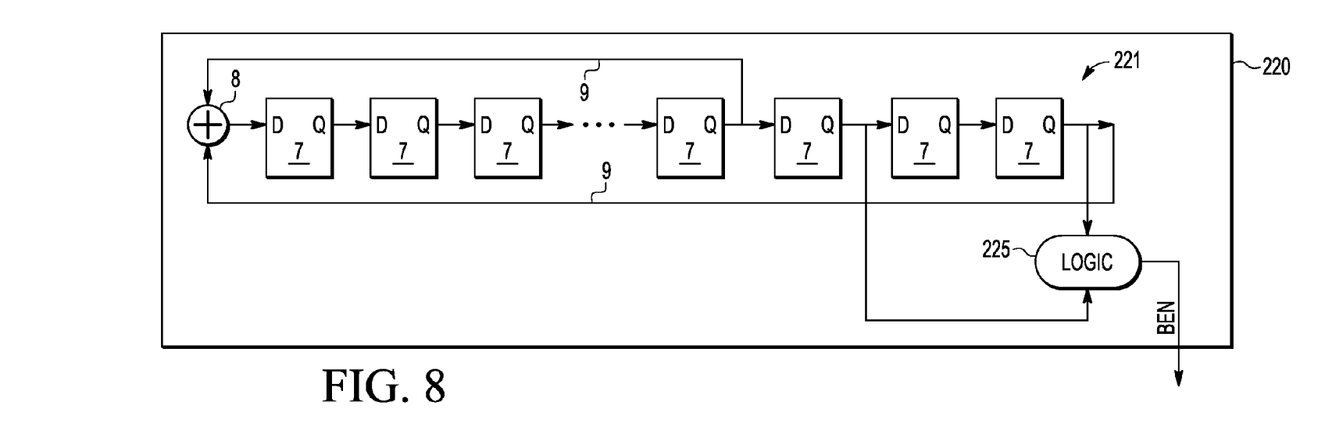
FIG. 8 is a simplified block diagram illustrating one embodiment of a random timeslot generator of FIG. 6 in accordance with a specific embodiment of the present disclosure.

FIG. 8 illustrates a particular embodiment 220 of the random timeslot generator 41 of FIG. 6. In particular, the random timeslot generator 220 includes an LFSR 221 having a plurality of D flip-flops 7 connected in series, with the output of two or more of the D flip-flops fed back via interconnects 9 to a logic operation 8 that provides a logic signal to a first D flip-flop 7 of the series. Two of the D flip-flops 7 are tapped to provide signals to a second logic device 225 that generates the BEN signal. For purposes of discussion, it is presumed that the LFSR taps provides to the logic device 225 are random signals each having a 50% activity factor. The activity factor of the signal BEN can vary based upon the selected logic device 225, and based upon the number of LFSR taps provided to the logic device 225. For example, if logic device 225 is a 2-input OR gate that is connected to two taps of LFSR 221, the signal BEN will have a activity factor of 75%. Alternatively, if logic device 225 is a 2-input AND gate that is connected to two taps of LFSR 221, the signal BEN will have a activity factor of 25%.

Figure 9:
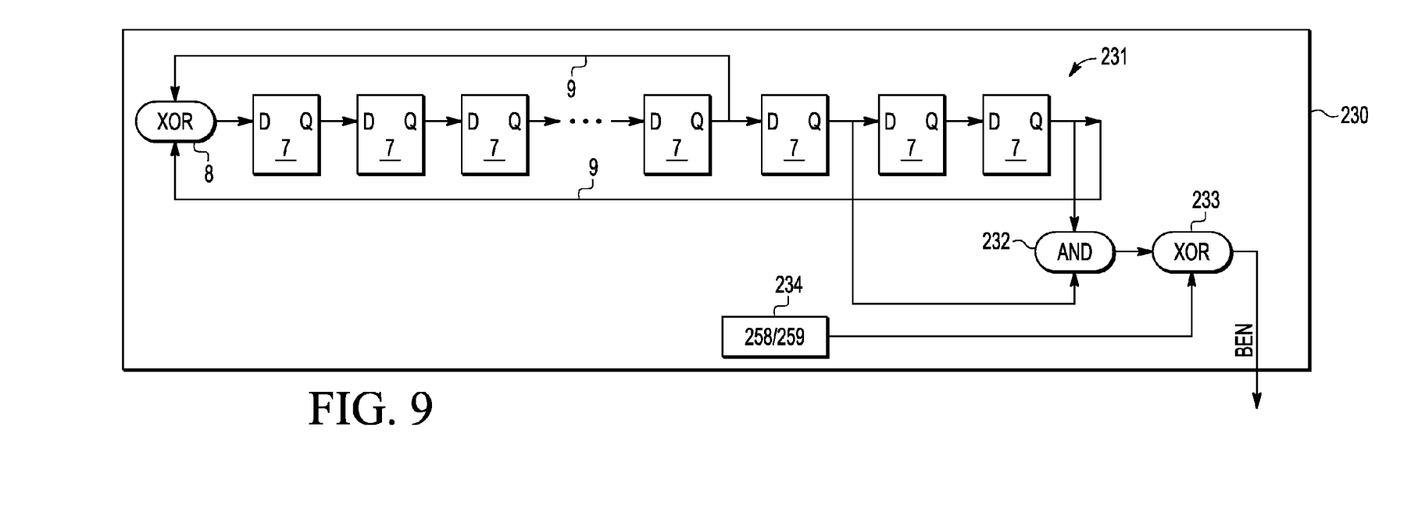
FIG. 9 is a simplified block diagram illustrating one embodiment of a random timeslot generator of FIG. 6 in accordance with a specific embodiment of the present disclosure.

FIG. 9 illustrates a particular embodiment 230 of the random timeslot generator 41 of FIG. 6. In particular, the random timeslot generator 230 includes an LFSR 231 having a plurality of D flip-flops 7 connected in series, with the output of two or more flip-flops 7 fed back via interconnects 9 to an exclusive-or gate 8. Two of the D flip-flops 7 have their outputs connected to an AND gate 232. The resulting activity factor at the output of AND gate 232 is 25%, presuming that LFSR 231 provides taps having activity factors of 50% to the inputs of AND gate 232. The output of AND gate 232 is connected to an input of a XOR gate 233. The second input of XOR gate 233 receives a logic signal based upon a logic bit stored at register location 234. In response to the logic bit stored at register location 234 being a logic zero, the BEN signal will have a activity factor of 25%. Alternatively, in response to the logic bit stored at register location 234 being a logic one, the BEN signal will have a activity factor of 75%. In this manner, the activity factor can be user programmable. It will be appreciated, that additional taps, and logic can be used in order to provide greater user control over the selected activity factor as illustrated in the embodiment of FIG. 10.

Figure 10:
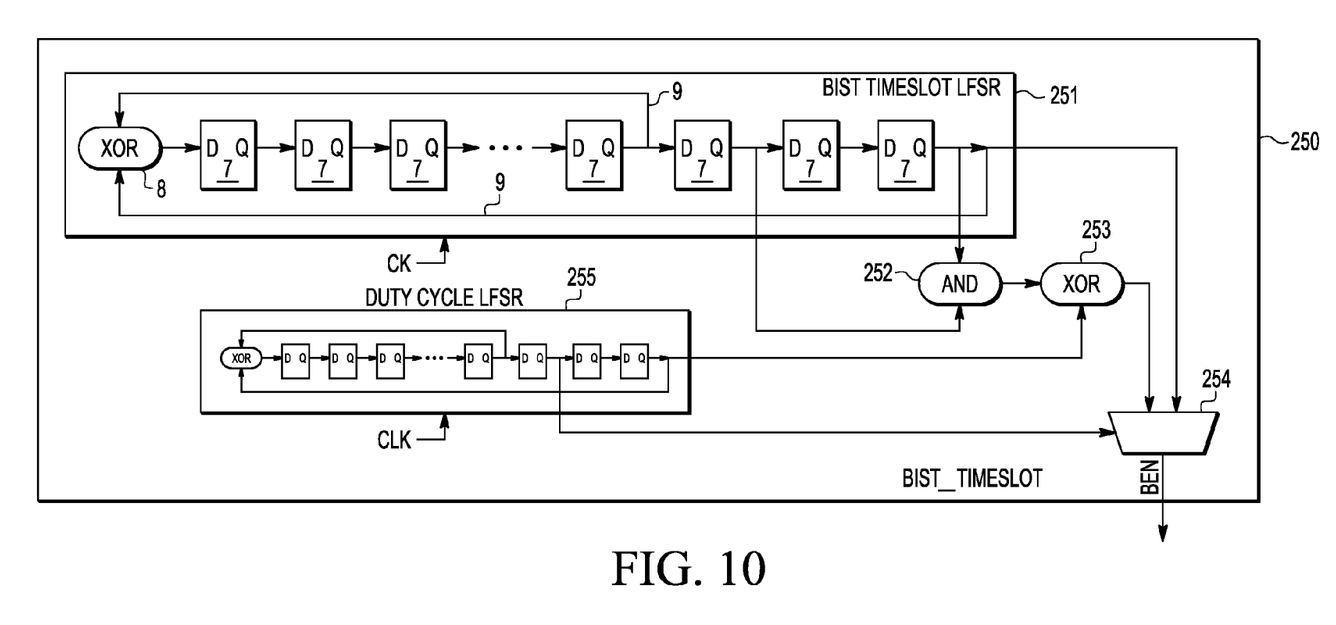
FIG. 10 is a simplified block diagram illustrating one embodiment of a random timeslot generator of FIG. 6 in accordance with a specific embodiment of the present disclosure.

FIG. 10 illustrates a particular embodiment 240 of the random timeslot generator 41 of FIG. 6, wherein the specified activity factor of the BEN signal changes in a random manner. In FIG. 10, LFSR 241 corresponds to LFSR 231 of FIG. 9, AND gate 241 corresponds to AND gate 232 of FIG. 9, and XOR gate 242 corresponds to XOR gate 233 of FIG. 9. However, instead of the second input of XOR 242 being connected to a user programmable register, the input of XOR gate 242 is connected to an output of a second LFSR 245 that provides a random signal. The activity factor generated at the output of XOR 242 is the same as the activity factor at AND gate 241, e.g., 75%, in response to the LFSR 245 providing a logic one to XOR gate 242; otherwise, the activity factor generated at the output of XOR 242 is inverted, e.g., 25%, in response to LFSR 245 providing a logic zero to XOR gate 242. The output of XOR gate 242 is connected to a first select input of a select module 244, which is illustrated as a multiplexor, and the output of one of the D flip-flops 7 having a 50% activity factor is connected to a second select input of the select module 244. An output of the LFSR 245 selects which one of the select inputs of the select module 244 are provided as the BEN signal. This results in the BEN signal having a particular activity factor for a random amount of time. According to an embodiment, the LFSR 245 can have a clock that is significantly slower than a clock provided to LFSR 241. For example, the clock SCK can be an order of magnitude or more slower than that of the clock CK.

Figure 11:
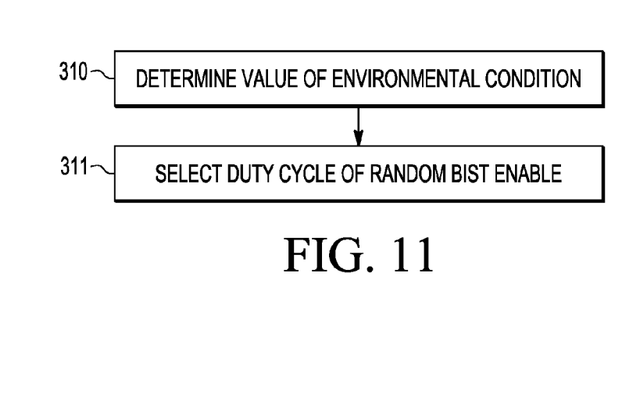
FIG. 11 is a simplified flow diagram illustrating a process for generating a random power consumption profile according to an embodiment of the present disclosure.

FIG. 11 illustrates a flow diagram of a method in accordance with a particular embodiment of the present disclosure. At block 310 an environmental condition at an integrated circuit die is determined. Examples of various environmental conditions include temperature, voltage, current, the like, and combinations thereof. At block 311, a particular activity factor for the randomly generated enable signal is selected by an activity factor select module (not shown) based upon the environmental condition. For example, according to an embodiment the higher a temperature detected at a location of the integrated circuit die, the lower the desired activity ratio; thereby reducing the amount of time that the BIST controller 222 is operational, while maintaining random power dissipation to obfuscate the power being used by a secure operation. Since in some embodiments, BIST operation may result in above average power dissipation, it may be desirable to monitor one or more environmental conditions in order to maintain a safe operating condition. According to an embodiment, an activity factor select module can monitor the environmental condition, and provide appropriate activity factor select values to control logic, such as to exclusive or gate 242, and to multiplexor 244.

In a first aspect, the method can include executing a security sensitive operation at a first portion of an integrated circuit die, and randomly enabling and disabling a BIST (built-in self test) module of the integrated circuit die concurrently with executing the security operation to change power consumption of the integrated circuit die.

In one embodiment of the first aspect, the first portion is a first processor core, and the security sensitive operation is implemented by executing secure code at the first processor core, and the BIST module is a portion of the integrated circuit die that tests a second processor core of the integrated circuit die. In another embodiment, in response to randomly enabling the BIST module, the BIST module accesses a memory of the second processor core. In still another embodiment, randomly enabling and disabling the BIST module is in response to executing the security sensitive operation.

In a particular embodiment of the first aspect, the BIST module accessing the memory includes writing randomly generated data to the memory. In an even more particular embodiment, randomly enabling and disabling the BIST module includes generating a randomly enabled and disabled signal at linear feedback shift register module and randomly enabling and disabling the BIST module based upon a state of the enable signal. In still another embodiment, randomly enabling and disabling the BIST module to change power consumption includes enabling the BIST operation in response to an enable signal being randomly asserted, wherein an expected ratio of an asserted portion of the enable signal to a negated portion (the A/N ratio) of the enable is defined.

In a further embodiment of the first aspect, the A/N ratio is user defined. In an even further embodiment, the expected A/N ratio is expected to be obtained by transitioning the signal between being asserted and being negated a plurality of times, wherein the asserted portions of the enable signal have random durations. In another embodiment, the defined A/N ratio is randomly selected, and changes at random times. In still another embodiment, randomly enabling of the BIST operation is based upon an environmental condition of the integrated circuit die. In yet another embodiment, executing the BIST operation is in response to setting a control bit in response to executing the security sensitive operation.

In a second aspect, a device can include a security sensitive module of an integrated circuit die to execute a security sensitive operation, a BIST (built-in self test) module to test at least a portion of the integrated circuit die, and a random value generator coupled to the security sensitive module and to the BIST module to randomly enable and disable the BIST module in response to the security sensitive module executing the security sensitive operation.

In one embodiment of the second aspect, executing the security sensitive module includes executing security sensitive code at a first processor core, and wherein at least a portion of the integrated circuit die includes a second processor core. In another embodiment, in response to the random value generator enabling the BIST module, the BIST module accesses a cache memory of the second processor core. In still another embodiment, in response to the random value generator enabling the BIST module, the BIST module accesses a memory of the integrated circuit die. In a further embodiment, in response to the random value generator enabling the BIST module, the BIST module writes random information to a memory of the integrated circuit die.

In a third aspect, the method can include determining an environmental condition of an integrated circuit die, and randomly enabling and disabling a BIST (built-in self test) module based upon a value of the environmental condition.

In one embodiment of the third aspect, the environmental condition is a temperature of the integrated circuit die. In another embodiment, an activity factor of a signal that enables and disables the BIST module is selected based upon the environmental condition.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Thus, it is to be understood that the architectures depicted herein are merely exemplary, and that in fact many other architectures can be implemented which achieve the same functionality. For example, in one embodiment, the illustrated elements of system 10 are circuitry located on a single integrated circuit or within a same device. Alternatively, system 10 may include any number of separate integrated circuits or separate devices interconnected with each other. For example, memory 18 may be located on a same integrated circuit as masters 12 and 14 or on a separate integrated circuit or located within another peripheral or slave discretely separate from other elements of system 10. Other modules 20 and can also be located on the same integrated circuit as one or more of the processors 12 and memory 18. Also for example, system 10 or portions thereof may be soft or code representations of physical circuitry or of logical representations convertible into physical circuitry. As such, system 10 may be embodied in a hardware description language of any appropriate type that identifies features that define an integrated circuit design definition to which integrated circuits are ultimately manufactured.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process.

The term "coupled," as used herein, is not intended to be limited to a direct connection or a mechanical coupling.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

What is claimed is:

1. A method comprising:
   executing a security sensitive operation at a security sensitive module of an integrated circuit die; and
   receiving a random value from a random value generator for randomly enabling or disabling a BIST (built-in self test) module of the integrated circuit die concurrently with executing the security operation to change power consumption of the integrated circuit die, the BIST module configured in a test mode of operation to test a portion of the integrated circuit die.

2. The method of claim 1, wherein the security sensitive module includes a first processor core implementing the security sensitive operation by executing secure code, and the portion of the integrated circuit die includes a second processor core of the integrated circuit die.

3. The method of claim 2, wherein in response to randomly enabling the BIST module, the BIST module accesses a memory of the second processor core.

4. The method of claim 3, wherein randomly enabling or disabling the BIST module is in response to executing the security sensitive operation.

5. The method of claim 3, wherein the BIST module accessing the memory includes writing randomly generated data to the memory.

6. The method of claim 1, wherein randomly enabling or disabling the BIST module includes generating a randomly enabled or disabled signal at a linear feedback shift register module and randomly enabling or disabling the BIST module based upon whether the signal is enabled or disabled.

7. The method of claim 1, wherein randomly enabling or disabling the BIST module to change power consumption includes enabling the BIST operation in response to an enable signal being randomly asserted, wherein an expected ratio of an asserted portion of the enable signal to a negated portion (the A/N ratio) of the enable signal is defined.

8. The method of claim 7, wherein the A/N ratio is user defined.

9. The method of claim 7, wherein the expected A/N ratio is expected to be obtained by transitioning the enable signal between being asserted and being negated a plurality of times, wherein the asserted portions of the enable signal have random durations.

10. The method of claim 7, wherein the defined A/N ratio is randomly selected, and changes at random times.

11. The method of claim 1, wherein randomly enabling of the BIST operation is based upon an environmental condition of the integrated circuit die.

12. The method of claim 1, wherein executing the BIST operation is in response to setting a control bit in response to executing the security sensitive operation.

13. A device comprising:
   a security sensitive module of an integrated circuit die to execute a security sensitive operation;
   a BIST (built-in self test) module to test at least a portion of the integrated circuit die; and
   a random value generator coupled to the security sensitive module and to the BIST module to randomly enable or disable the BIST module in response to the security sensitive module executing the security sensitive operation.

14. The device of claim 13, wherein executing the security sensitive module includes executing security sensitive code at a first processer core, and wherein at least a portion of the integrated circuit die includes a second processor core.

15. The device of claim 13, wherein in response to the random value generator enabling the BIST module, the BIST module accesses a cache memory of the second processor core.

16. The device of claim 13, wherein in response to the random value generator enabling the BIST module, the BIST module accesses a memory of the integrated circuit die.

17. The device of claim 13, wherein in response to the random value generator enabling the BIST module, the BIST module writes random information to a memory of the integrated circuit die.

* * * * *